July 4, 1939. M. B. ANDRIE 2,164,486

DOOR HANDLE ASSEMBLY

Filed May 31, 1938

INVENTOR.
Michael B. Andrie
BY Earl & Chappell
ATTORNEYS.

Patented July 4, 1939

2,164,486

UNITED STATES PATENT OFFICE 2,164,486

DOOR HANDLE ASSEMBLY

Michael B. Andrie, Grand Rapids, Mich., assignor to W. B. Jarvis Company, Grand Rapids, Mich.

Application May 31, 1938, Serial No. 210,915

9 Claims. (Cl. 292—349)

The main objects of my invention are:

First, to provide a door handle assembly having improved provisions for holding the same in operative relation and preventing rattling of the parts thereof.

Second, to provide an assembly of the type described which is characterized by its simplicity and economy of construction.

Third, to provide a door handle construction which is readily and quickly assembled and resists displacement in assembled condition.

Further objects relating to details and economies of my invention will definitely appear from the description to follow. The invention is defined in the claims.

A structure embodying the features of my invention is illustrated in the accompanying drawing, wherein.

Figure 1:
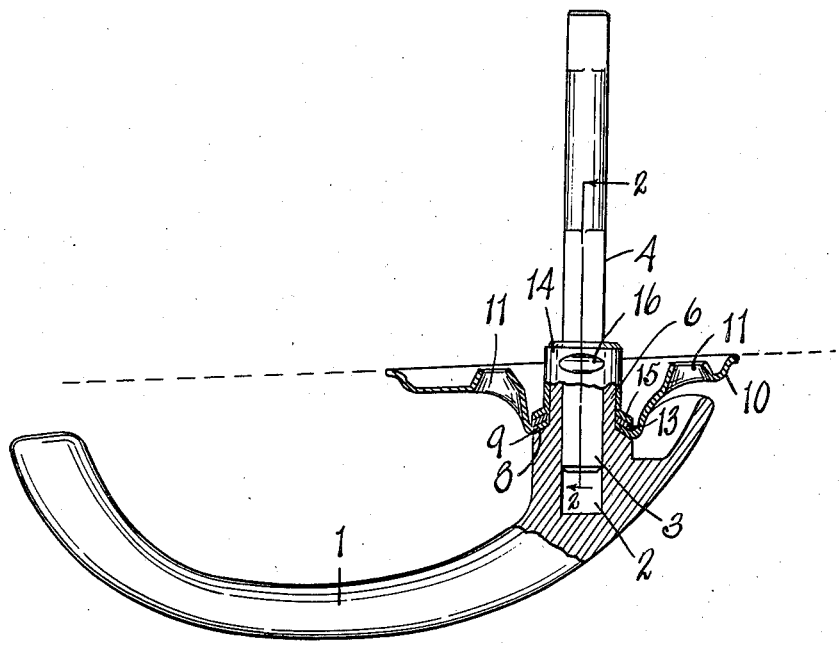
Fig. 1 is a plan view partially broken away and in horizontal section illustrating the elements of the handle in operative assembled relation.
Figure 2:
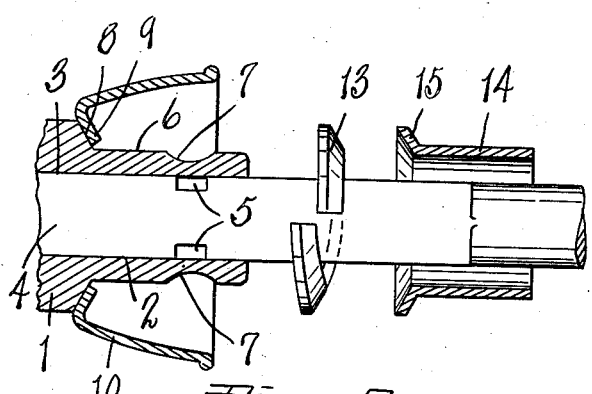
Fig. 2 is an enlarged fragmentary view in section on line 2—2 of Fig. 1, illustrating the elements of the construction in separated relation.

In the drawing the reference numeral 1 indicates a door handle such as is employed for automobile doors and the like, although it should be noted that my invention is not restricted to this field. The shank of the handle is provided with a squared aperture 2 receiving the squared end 3 of the spindle or chill 4. The chill is provided with a pair of opposed transverse notches or slots 5 at a predetermined distance from the end thereof. Referring to Fig. 2, it will be seen that the shank of handle 1 extends axially of the chill and is reduced in section at 6. Furthermore, the said reduced portion 6 of the shank is provided with a pair of opposed grooves 7 for a purpose to be described.

One end of reduced portion 6 terminates in an angular shoulder 8 which is suitably formed to provide an abutment for the angular annular flange 9 of an escutcheon 10. This escutcheon is pierced at 11 to receive securing screws, and if desired the handle 1 may be provided with overhanging lips 12 to conceal the said screws when the handle is locked.

Figure 3:
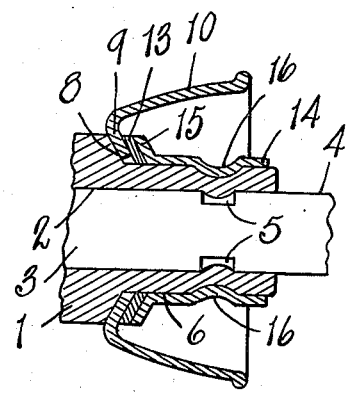
Fig. 3 is a view similar to Fig. 2, illustrating the parts in final assembled relation.

With the escutcheon 10 in position as illustrated in Fig. 2, I next place around reduced portion 6 a spring thrust washer 13 of the split ring type which, as illustrated in Figs. 2 and 3, is dished or conformed to nest snugly over the flange 9. A retaining sleeve 14 is then assembled over the reduced portion 6 and pushed endwise against washer 13 to compress the same into the form illustrated in Fig. 3. Retaining sleeve 14 also has an angular annular flange 15 adapted to nest with the washer 13 and flange 9.

With the parts in the position described, i. e. with spring 13 compressed, I next indent sleeve 14 at 16, at the same time forcing the handle extension 6 into grooves 5 at the portion 7 of the extension and thus lockingly engaging the sleeve, handles and chill.

From the foregoing it will be apparent that I have provided not only an assembly of great simplicity, but one which is free from the possibility of rattling due to the presence of the thrust washer 13 which will automatically take up any looseness which may arise due to wear between the parts. Needless to say, because of the aforesaid simplicity, the parts are inexpensive and readily and quickly assembled, there being only a transverse sliding operation once the escutcheon, washer and sleeve are placed on the handle extension.

I have illustrated and described my improvements in an embodiment which is very practical. I have not attempted to illustrate or describe other embodiments or adaptations as it is believed this disclosure will enable those skilled in the art to embody or adapt my invention as may be desired.

Having thus described my invention what I claim as new and desire to secure by Letters Patent is:

1. A door handle assembly comprising a handle member having a reduced recessed shank and an inclined annular shoulder, a door spindle telescopingly engageable with the shank and having locking notches therein, an escutcheon telescopingly engageable on said shank and having an inturned annular flange abutting said shoulder, an angled spring thrust washer engageable on the shank in nested relation to the flange, and a retaining sleeve engageable on the shank, said sleeve having an out-turned flange for end engagement with said washer to compress the same, said sleeve and shank being deformed adjacent said notches for locking engagement therewith to hold the spindle, handle and escutcheon in assembled position.

2. A door handle assembly comprising a handle member having an abutment thereon, a door spindle in fixed rotative relation to the handle member and having a locking notch therein, an escutcheon telescopingly engageable on said handle member in end engagement with said abutment, a spring thrust washer engageable on the handle member in end engagement with the escutcheon, and a retaining sleeve in abutting relation to the washer, said sleeve being slidable axially to compress said washer and being deformed adjacent said notch for locking engagement therewith to hold the spindle, handle and escutcheon in assembled position.

3. In a handle assembly, a spindle, a handle member having a shank disposed axially of and receiving said spindle, an escutcheon, and means for securing said handle, spindle and escutcheon in assembled relation comprising a spring thrust washer and a retaining sleeve adapted to be mounted on said shank, said escutcheon having an inturned angled flange and said sleeve and washer being conformed for endwise nesting engagement with said flange and one another, said washer in assembled position being axially compressed and the sleeve and shank being deformed into locking engagement with the spindle to hold the parts in assembled relation.

4. In a handle assembly, a spindle, a handle member having a shank disposed axially of and receiving said spindle, an escutcheon, and means for securing said handle, spindle and escutcheon in assembled relation comprising a spring thrust washer and a retaining sleeve adapted to be mounted on said shank, said escutcheon having an inturned angled flange and said sleeve and washer being conformed for endwise nesting engagement with said flange and one another, said washer in assembled position being axially compressed, and means for holding the sleeve and shank in fixed axial relation to the spindle.

5. In a handle assembly, a handle member having an angled abutment, a spindle, and an escutcheon on the handle, and means for securing said handle, spindle, and escutcheon in assembled relation comprising a spring thrust member and a retaining sleeve mounted on said handle, said escutcheon and sleeve having flanges and said flanges and thrust member being angularly conformed for endwise nesting engagement with said abutment and with one another, and means for holding said sleeve on said handle with said thrust member compressed.

6. In a handle assembly, a handle member having an abutment, an escutcheon on the handle, means for securing said handle and escutcheon in assembled relation comprising a spring thrust member and a retaining sleeve mounted on said handle, said escutcheon and sleeve having flanges and said flanges and thrust member being conformed for endwise engagement with said abutment and with one another, and means for holding said sleeve on said handle with said thrust member in compressed condition.

7. A door handle assembly comprising a handle and an abutment, an escutcheon rotatable relative to said handle and abutting said abutment, a thrust member engageable on the handle with the escutcheon, and a retaining member engageable on the handle with the thrust member, said member having an outturned flange for end engagement with said thrust member to compress the same, said retaining member being deformed for locking engagement with said handle to hold the handle and escutcheon in assembled relation.

8. A handle assembly comprising a spindle, a handle provided with a spindle receiving extension and carrying an abutment, an escutcheon on said extension in engagement with said abutment, a sleeve on said extension, and an axial thrust spring engaging said escutcheon and surrounding said extension between said escutcheon and sleeve, said sleeve and extension being deformed radially to secure the same to one another and to the spindle.

9. A handle assembly comprising a spindle, a handle provided with a spindle receiving extension and carrying an abutment, an escutcheon on said extension in engagement with said abutment, a sleeve on said extension, an axial thrust spring surrounding said extension between said escutcheon and sleeve, and means for securing said handle, spindle, and sleeve together with said spring compressed between the escutcheon and sleeve.

MICHAEL B. ANDRIE.